US00RE35768E

United States Patent [19]

Kaspar et al.

[11] E Patent Number: Re. 35,768

[45] Reissued Date of Patent: Apr. 14, 1998

[54] PROCESS FOR THE PREPARATION OF IMPROVED DYESTUFF GRANULES FROM SUSPENSION CONTAINING A PROPYLENE OXIDE-ETHYLENE OXIDE COPOLYMER

[75] Inventors: Vaclav Kaspar, Cologne; Horst Brandt, Odenthal; Gottfried Popp, Leverkusen, all of Germany

[73] Assignee: Bayer Aktiengesellschaft, Leverkusen, Germany

[21] Appl. No.: 450,280

[22] Filed: May 25, 1995

Related U.S. Patent Documents

Reissue of:

[64] Patent No.: 5,213,583
Issued: May 25, 1993
Appl. No.: 796,111
Filed: Nov. 21, 1991

[30] Foreign Application Priority Data

Nov. 29, 1990 [DE] Germany ..... 40 38 002.5

[51] Int. Cl.[6] ..... C08J 3/20; C08K 9/02

[52] U.S. Cl. ..... 8/526; 8/506; 8/552; 8/558; 8/609; 8/662; 427/212

[58] Field of Search ..... 8/506, 524–527, 8/552, 557, 558, 662; 427/212

[56] References Cited

U.S. PATENT DOCUMENTS

| | | | |
|---|---|---|---|
| 3,843,380 | 10/1974 | Beyn | 106/499 |
| 4,134,725 | 1/1979 | Büchel et al. | 8/526 |
| 4,487,609 | 12/1984 | Putzar | 8/524 |
| 4,624,678 | 11/1986 | Schneider | 8/526 |
| 4,961,755 | 10/1990 | Bruttel et al. | 8/526 |
| 5,073,295 | 12/1991 | Bruttel et al. | 252/301.19 |

FOREIGN PATENT DOCUMENTS

| | | |
|---|---|---|
| 490814 | 6/1992 | European Pat. Off. . |
| 2158084 | 11/1985 | United Kingdom . |

*Primary Examiner*—Margaret Einsmann
*Attorney, Agent, or Firm*—Sprung Horn Kramer & Woods

[57] ABSTRACT

To prepare storage-stable, low-dusting dyestuff granules which are readily soluble in plastics, a suspension of the dyestuff containing 0.1–5% by weight of a polyglycol are dried while being granulated.

7 Claims, No Drawings

PROCESS FOR THE PREPARATION OF IMPROVED DYESTUFF GRANULES FROM SUSPENSION CONTAINING A PROPYLENE OXIDE-ETHYLENE OXIDE COPOLYMER

Matter enclosed in heavy brackets [ ] appears in the original patent but forms no part of this reissue specification; matter printed in italics indicates the additions made by reissue.

The invention relates to a process for the preparation of dyestuff preparations in granule form.

Processes in which dyestuffs for plastics are dried in a vacuum cabinet or paddle drier are known. In these processes, the dyestuff particles have to be ground in a mill addionally. A very large amount of dust forms during this operation, and this of course results in losses. High suction must be applied to avoid a dust nuisance to the operating personnel.

Processes for the preparation of dyestuff preparations in granule or powder form in which dispersions or preferably solutions of dyestuffs and if appropriate plasticizers, surfactants and other auxiliaries are sprayed into melts of waxes and/or resins which are insoluble or sparingly soluble in water.

Disadvantages of the known processes are the dust nuisance and the high concentrations of surfactants, dispersing auxiliaries and other additives employed to avoid this nuisance.

The invention was based on the object of providing an improved process for the preparation of free-flowing, low-dusting granules with a small addition of auxiliaries, if possible of below 5%.

The invention relates to a process for the preparation of storage-stable and low-dusting dyestuff granules which are readily soluble in plastics, characterised in that a suspension of the dyestuff containing 0.1–5% by weight, based on the dry dyestuff, of a polyglycol is dried while being granulated.

In a preferred embodiment, the polyglycol has a molecular weight of 900–15,000, in particular 5,000–8,000, calculated from the OH number. In another preferred embodiment, the polyglycol is a copolymer of propylene oxide and ethylene oxide. In another preferred embodiment the polyglycol is a copolymer of propylene oxide and ethylene oxide having an average molar mass, calculated from the OH number, of between 2,000 and 10,000. In another preferred embodiment, the weight of the polyglycol is 1–3%, based on the dry dyestuff. In another preferred embodiment, the mixture contains, in addition to the polyglycol, polyacrylic acid and/or salts thereof, in particular sodium salts, in particular up to 2%, based on the dry content of the dyestuff. In another preferred embodiment, a rotating disc or pressure jet is used as the atomising element during the granulation.

In a preferred embodiment, the dyestuff suspension is an aqueous suspension. In another preferred embodiment, the granulation takes place by spray drying. A rotating disc or a pressure jet as described in Chemiker Ztg./Chem. Apparatur/Verfahrenstechnik, Volume 93 (1969) No. 13 is advantageously used as the atomising element. In another preferred embodiment, the free material is sifted by means of an annular channel or outside the drier, e.g. in a subsequent fluidised bed. The granulated free material can be regranulated after liquefaction. In another preferred embodiment, the aqueous press-cake of the dyestuff is stirred in water. After stirring and homogenisation, it is then subjected to wet grinding, for example in a rotor-stator mill and/or bead mill. The dispersion thus formed with a particle size of between 1 and 50 μm is then spray-dried to microgranules in an atomising drier, preferably a pressure jet tower.

The intake and discharge temperatures here depend, alongside the required residual moisture of ≦0.5%, on the safety measures. Microgranules of between 50 and 300 μm which, in contrast to the powder, are low-dusting and free-flowing are obtained by this process. The granules are storage-stable, that is to say the granules are not destroyed by stresses, for example during transportation. In contrast, if spray-drying is carried out without the addition according to the invention, the microgranules do not have the stability, they disintegrate and are no longer low-dusting, and their ability to flow is greatly reduced.

The choice of dyestuff essentially depends on the particular intended use of the preparations. All the customary water-insoluble dyestuffs of the most diverse chemical classes are in principle possible, including whiteners, for example styrene
pyrazolone
quinophthalone
naphthazine
perinone
anthraquinone
coumarin
thioxanthal
thioindigo
monoazo
disazo The proportion of dyestuff content in the granules is in general 95 to 99% by weight.

The particle sizes of the microgranules can vary within wide ranges and are in general 5 to 800 μm, and preferably 50 to 300 μm.

The microgranules are in general advantageously prepared by a procedure in which the dyestuff press-cake is first intensively mixed discontinuously with the auxiliary in a stirred kettle and if appropriate the mixture is heated, the temperature and solids content being chosen so that the resulting dispersion of the dyestuff can easily be atomised. By selecting a suitable atomising element, the atomisation can be carried out so that the particle diameters of the resulting spherical granules are within the preferred ranges. The preferred range of 40 to 800 μm is obtained by spraying with one-component nozzles under pressures of up to 100 bar.

The formulations obtainable according to the invention are low-dusting and free-flowing.

The granules prepared by the new process have many possible uses: for example, they are suitable for colouring plastics.

Particularly suitable plastics are ABS, polycarbonate, butylstyrenes, polyesters, polystyrenes and polyamides, as well as blends of the abovementioned plastics.

The colouring of the plastics with the dyestuff granules prepared according to the invention is preferably carried out in bulk, as described, for example, in Coloring of Plastics, John Wiley and Sons, N.Y., 1979, *e.g. by dissolution in the molten or dissolved plastic.*

The quality of the granules can be increased by carrying out a sifting operation, as described, for example, in U.S. application Ser. No. 4,198,264. The fine material can be stirred up and spray-dried again.

Compared with drying in a paddle drier and grinding, the process described has the advantage that significantly less dust nuisance occurs during preparation, since the operations from vigorous mixing to the spray-dried granules are carried out in an aqueous phase, and furthermore dry grinding with the known losses is dispensed with, so that the process described leads to a significantly higher yield.

EXAMPLE 1

2 parts of a copolymer of propylene oxide and ethylene oxide having an average molar mass—calculated from the OH number—of about 6,500 g/mol are mixed with 322.5 parts of an aqueous press-cake or the dyestuff of the formula

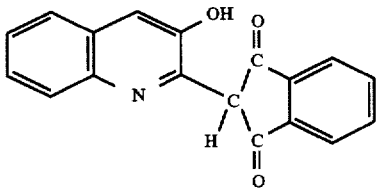

and 675.5 parts of water at room temperature, with vigorous stirring. The press-cake has a solids content of 61.4%. After a stirring time of about 30 minutes, this approximately 20% strength dispersion solid content is ground in one pass in a bead mill containing beads of 2 mm in size. The dispersion then has an average particle diameter of about 30 μm. This dispersion is then spray-dried to microgranules in a pressure jet tower at an intake temperature of 180° C. and a discharge temperature of 85° C., with constant stirring of the feed mixture. The resulting microgranules have an average particle diameter of about 250 μm and their residual moisture content is 0.3%. The granules are free-flowing and low-dusting.

EXAMPLE 2

1.8 parts of a copolymer of propylene oxide and ethylene oxide having an average molar mass of about 6,500 g/mol are mixed with 4.8 parts of a polyacrylic acid having an average molar mass of about 3,000 g/mol, 461.8 parts of an aqueous press-cake of the dyestuff of the formula

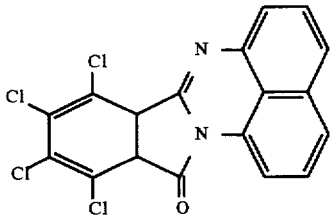

and 531.9 parts of water at room temperature, while stirring vigorously. The press-cake has a solids content of about 63.6%. After a stirring time of about 30 minutes, this approximately 30% strength suspension is ground in one pass in a bead mill containing beads of 2 mm in size. The pH of the dispersion is brought to the pH of about 6 with NaOH. The dispersion then has an average particle diameter of about 25 μm. This dispersion is then spray-dried to microgranules in a pressure jet tower at an intake temperature of 205° C. and a discharge temperature of 88° C., with constant stirring of the feed mixture. The resulting microgranules are free-flowing and low-dusting, the average particle size is about 180 μm and the residual moisture content is about 0.1%.

EXAMPLE 3

The following dyestuffs are also finished and spray-dried to microgranules in accordance with Examples 1 and 2:

Orange 3.1

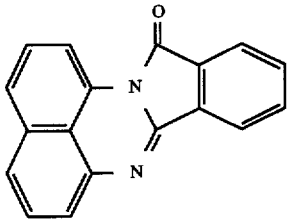

Green 3.2

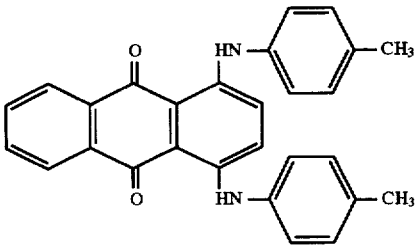

Green 3.3

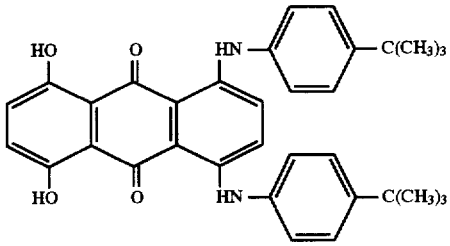

Orange 3.4

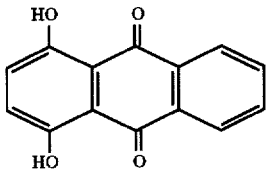

Red 3.5

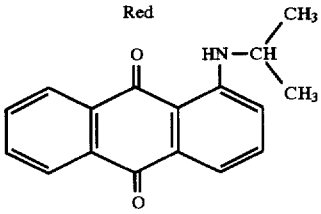

Red 3.6

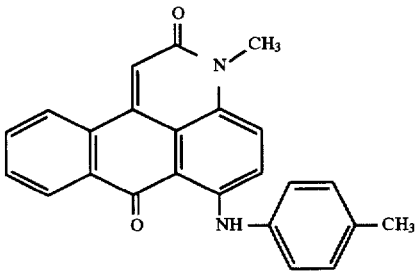

-continued

Red

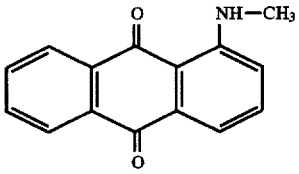

Violet

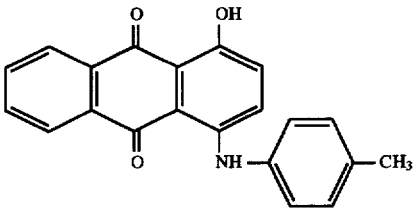

Violet

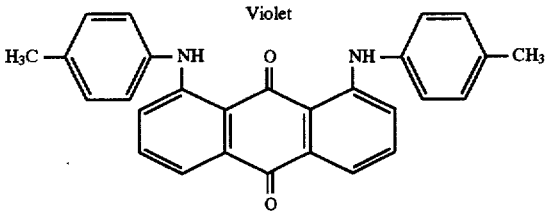

Yellow

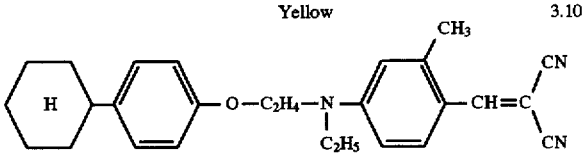

We claim:

3.7 1. Process for the preparation of storage-stable, low-dusting dyestuffs granules that are readily soluble in plastics, said process *being* characterized in that a suspension of (a) a water-insoluble or sparingly-soluble-in-water dyestuff, (b) 0.1 to 5% by weight, based on the dry dyestuff, of a polyglycol which is a copolymer of propylene oxide and ethylene oxide, and (c) *optionally* up to 2%, based on the dry dyestuff, of polyacrylic acid and/or salts thereof, is dried while being granulated *with spray drying*, the polyglycol 3.8 having a molecular weight of 900–15,000, calculated from the OH, *the granules comprising 95 to 99% by weight of the dyestuff.*

2. Process according to claim 1, characterised in that an aqueous suspension of the dyestuff is used.

[3. Process according to claim 1, characterised in that the granulation is carried out with spray drying.]

4. Process according to claim 1, characterised in that the polyglycol is a copolymer of propylene oxide and ethylene oxide having an average molar mass, calculated from the OH number, of between 2,000 and 10,000.

3.9 [5. Process according to claim 1, characterised in that the weight of the polyglycol, based on the dry dyestuff, is not more than 5%.]

6. Process according to claim 1, characterised in that a rotating disc or pressure jet is used as [the] *an* atomising element during granulation.

7. Process for colouring plastics by granules obtained according to claim 1, characterised in that the granules are dissolved in the molten or dissolved plastic.

3.10 8. Process according to claim [5] *1*, characterized in that the weight of the polyglycol, based on the dry dyestuff, is 1–3%.

*9. Process according to claim 1, wherein the suspension contains the polyacrylic acid or salts thereof.*

* * * * *